United States Patent
Dry et al.

(10) Patent No.: US 9,845,029 B1
(45) Date of Patent: Dec. 19, 2017

(54) PASSIVE CONFORMAL SEAT WITH HYBRID AIR/LIQUID CELLS

(71) Applicant: Ford Global Technologies, LLC, Dearborn, MI (US)

(72) Inventors: Alan George Dry, Grosse Pointe Woods, MI (US); Joseph S. Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/174,586

(22) Filed: Jun. 6, 2016

(51) Int. Cl.
- *B60N 2/42* (2006.01)
- *B60N 2/28* (2006.01)
- *B60R 21/16* (2006.01)
- *B60N 2/44* (2006.01)
- *B60N 2/68* (2006.01)
- *B60N 2/70* (2006.01)

(52) U.S. Cl.
CPC ............. *B60N 2/4415* (2013.01); *B60N 2/42* (2013.01); *B60N 2/686* (2013.01); *B60N 2/70* (2013.01)

(58) Field of Classification Search
CPC ........ B60N 2/42; B60N 2/4415; B60N 2/686; B60N 2/70
USPC .................................................... 297/216.11
See application file for complete search history.

(56) References Cited

U.S. PATENT DOCUMENTS

| | | | |
|---|---|---|---|
| 771,773 | A | 10/1904 | Feely |
| 1,125,155 | A | 1/1915 | Nunn |
| 2,272,505 | A | 2/1942 | Biggs |
| 2,661,050 | A | 12/1953 | Felter |
| 2,725,921 | A | 12/1955 | Markin |

(Continued)

FOREIGN PATENT DOCUMENTS

| | | |
|---|---|---|
| CN | 201650491 U | 11/2010 |
| CN | 203097995 U | 7/2013 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Rodney B White
(74) *Attorney, Agent, or Firm* — Vichit Chea; Price Heneveld LLP

(57) ABSTRACT

A vehicle seating assembly includes a conformal seating assembly coupled with a rigid shell and includes a seat base, a seatback base, seat side bolsters, and seatback side bolsters. An air-filled sender panel is disposed in the seat base. An air-filled receiver cell is disposed in one of the seat side bolster and the seatback side bolster. A liquid-filled sender panel is disposed between the air-filled receiver cell and the rigid shell. A liquid-filled receiver cell is adjacent the air-filled receiver cell and disposed in one of the seat side bolster and the seatback side bolster. A first distribution rail system is disposed on a first side of the seat base. A second distribution rail system is disposed on a second side of the seat base. A plurality of capillaries provide fluid communication between the sender panels and the receiver cells. A topper pad extends over the conformal seating assembly.

20 Claims, 5 Drawing Sheets

(56) References Cited

U.S. PATENT DOCUMENTS

| | | |
|---|---|---|
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A | 11/1998 | Karschin et al. |

(56) References Cited

U.S. PATENT DOCUMENTS

| | | |
|---|---|---|
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Lachat |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Masayuki Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |

(56) References Cited

U.S. PATENT DOCUMENTS

| | | | |
|---|---|---|---|
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,114 B2 | 3/2008 | Reynolds et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,654,613 B2 * | 2/2010 | Bass .................. B60N 2/2812 297/216.11 |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| D616,178 S | 5/2010 | Baggenstos |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,748,781 B2 * | 7/2010 | Bass .................. B60N 2/2809 297/216.11 |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,011,728 B2 | 9/2011 | Kohl et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |

(56) References Cited

U.S. PATENT DOCUMENTS

| | | |
|---|---|---|
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,727,374 B1 | 5/2014 | Line et al. |
| 8,752,894 B2 | 6/2014 | Trimborn et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,126,504 B2 | 9/2015 | Line et al. |
| 9,126,508 B2 | 9/2015 | Line et al. |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurksi et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |

(56) References Cited

U.S. PATENT DOCUMENTS

| | | |
|---|---|---|
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 3386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | 9919708 | 4/1999 |
| WO | WO9958022 A1 | 11/1999 |
| WO | 0021797 A1 | 4/2000 |
| WO | 0144026 A1 | 6/2001 |
| WO | WO2006131189 A1 | 12/2006 |
| WO | 2007009893 A2 | 1/2007 |
| WO | WO2007028015 A2 | 3/2007 |
| WO | 2008019981 A1 | 2/2008 |

(56) References Cited

FOREIGN PATENT DOCUMENTS

| WO | WO2008073285 A1 | 6/2008 |
|---|---|---|
| WO | 2010096307 A1 | 8/2010 |
| WO | WO2011021952 A1 | 2/2011 |
| WO | 2011068684 A1 | 6/2011 |
| WO | WO2012008904 A1 | 1/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah MacMurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

Metro Magazine, "Vehicle Seating Manufacturers Offer Flexible Dseign Options, Enhanced Construction," http://www.metro-magazine.com/article/prinl/2012/01/yehicle-seating-manufacturers-offer-flexible-design-options-enahnced-construction.aspx, Jan. 2012, 3 pgs.

Car Reviews, "Audi A4 Saloon R54", http://www.theaa.com/allaboutcars/cartestreports/2006037.html, Apr. 2006, 5 pgs.

Recaro GmbH & Co. KG, "Seat Range", ID No. 7218054, Mar. 2010, 21 pgs.

Kelley Blue Book, "2011 Mercedes-Benz CL-Class", http://www.kbb.com/mercedes-benz/cl-class/2011-mercedes-benz-cl-class/, Feb. 28, 2013, 5 pgs.

Lexus, "The all-new LEXUS 2013", lexus.com P2-332, Feb. 2012, 13 pgs.

Mercedes-Benz, "Interior comfort—spoilt for choice", http://www.zungfu.com/pc_E_saloon.comfort.1.shtml, Feb. 28, 2013, 3 pgs.

Rostra Precision Controls Inc., "Universal Lumbar Installation Instructions", http://www.rostra.com/manuals/form3132F.pdf, Nov. 2, 2007, 8 pgs.

"Seats", http://www.bavarianmw.com/guide-4400.html,www.bmwmanuals.org, 2012, 5 pgs.

Mercedes-Benz, "Seat belts and airbags", http://www.mbusa.G0m/vcm/MB/DigitalAssets/pdfmb/serviceandparts/seatbelts_airbags.pdf, Oct. 27, 2005, 11 pages.

SAE International, "Capacitive Sensors Increase Safety, Comfort", http://sae.org/automag/technewsletter/071106Electronics/04.htm, Jun. 13, 2013, 3 pages.

General Motors LLC, "2013 Chevrolet Spark Owner Manual," copyright 2012, 356 pages.

Matthew W Ing, United States Patent and Trademark Office, Non Final Office Communication re U.S. Appl. No. 13/749,561, dated Oct. 16, 2015, 33 pages.

Richard A Lowry, United States Patent and Trademark Office, Non Final Office Communication re U.S. Appl. No. 13/748,847, dated Sep. 10, 2014, 14 pages.

David E Allred, United States Patent and Trademark Office, Non Final Office Communication re U.S. Appl. No. 13/748,857, dated Aug. 25, 2014, 13 pages.

Timothy J Brindley, United States Patent and Trademark Office, Final Office Communication re U.S. Appl. No. 13/749,568, dated Mar. 26, 2015, 9 pages.

Timothy J Brindley, United States Patent and Trademark Office, Non Final Office Communication re U.S. Appl. No. 13/749,568, dated Sep. 8, 2014, 9 pages.

Milton Nelson Jr., United States Patent and Trademark Office, Final Office Communication re U.S. Appl. No. 13/749,572, dated Mar. 3, 2015, 13 pages.

Milton Nelson Jr., United States Patent and Trademark Office, Non Final Office Communication re U.S. Appl. No. 13/749,572, dated Sep. 30, 2014, 20 pages.

Nicole T Verley, United States Patent and Trademark Office, Non Final Office Communication re U.S.Appl. No. 13/749,589, dated Oct. 4, 2013, 12 pages.

Timothy J Brindley, United States Patent and Trademark Office, Non Final Office Communication re U.S. Appl. No. 13/749,595, dated Aug. 28, 2014, 10 pages.

Timothy J Brindley, United States Patent and Trademark Office, Final Office Communication re U.S. Appl. No. 13/749,595, dated Jan. 12, 2015, 10 pages.

Timothy J Brindley, United States Patent and Trademark Office, Non Final Office Communication re U.S. Appl. No. 13/749,584, dated Sep. 15, 2014, 9 pages.

Yolanda G Giacoman, United States Patent and Trademark Office, Final Office Communication re U.S. Appl. No. 13/748,862, dated Dec. 30, 2015, 10 pages.

Yolanda G Giacoman, United States Patent and Trademark Office, Non Final Office Communication re U.S. Appl. No. 13/748,862, dated Aug. 13, 2015, 9 pages.

Yolanda G Giacoman, United States Patent and Trademark Office, Final Office Communication re U.S. Appl. No. 13/748,862, dated Mar. 10, 2015, 19 pages.

Yolanda G Giacoman, United States Patent and Trademark Office, Non Final Office Communication re U.S. Appl. No. 13/748,862, dated Sep. 25, 2014, 16 pages.

Milton Nelson Jr., United States Patent and Trademark Office, Non Final Office Communication re U.S. Appl. No. 13/749,602, dated Sep. 19, 2014, 9 pages.

Melissa Ann Black, United States Patent and Trademark Office, Non Final Office Communication re U.S. Appl. No. 13/914,666, dated Mar. 13, 2015, 6 pages.

Philip F Gabler, United States Patent and Trademark Office, Non Final Office Communication re U.S. Appl. No. 14/025,483, dated Dec. 17, 2014, 8 pages.

Philip F Gabler, United States Patent and Trademark Office, Final Office Communication re U.S. Appl. No. 14/025,483, dated Apr. 23, 2015, 10 pages.

Philip F Gabler, United States Patent and Trademark Office, Non Final Office Communication re U.S. Appl. No. 14/025,483, dated Aug. 18, 2015, 14 pages.

Philip F Gabler, United States Patent and Trademark Office, Final Office Communication re U.S. Appl. No. 14/025,483, dated Dec. 18, 2015, 14 pages.

Peter R Brown, United States Patent and Trademark Office, Final Office Communication re U.S. Appl. No. 14/104,780, dated Dec. 1, 2015, 5 pages.

Peter R Brown, United States Patent and Trademark Office, Non Final Office Communication re U.S. Appl. No. 14/104,780, dated Jun. 29, 2015, 9 pages.

Nicole T Verley, United States Patent and Trademark Office, Advisory Action for U.S. Appl. No. 14/056,005, dated Sep. 30, 2015, 3 pages.

Nicole T Verley, United States Patent and Trademark Office, Final Office Communication re U.S. Appl. No. 14/056,005, dated Jun. 10, 2015, 8 pages.

(56) References Cited

OTHER PUBLICATIONS

Nicole T Verley, United States Patent and Trademark Office, Non Final Office Communication re U.S. Appl. No. 14/056,005, dated Mar. 2, 2015, 8 pages.
Peter R Brown, United States Patent and Trademark Office, Non Final Office Communication re U.S. Appl. No. 14/056,000, dated Mar. 4, 2015, 7 pages.
Peter R Brown, United States Patent and Trademark Office, Non Final Office Communication re U.S. Appl. No. 14/056,000, dated Oct. 1, 2014, 8 pages.
Philip F Gabler, United States Patent and Trademark Office, Final Office Communication re U.S. Appl. No. 14/076,893, dated Sep. 29, 2015, 13 pages.
Philip F Gabler, United States Patent and Trademark Office, Non Final Office Communication re U.S. Appl. No. 14/076,893, dated Apr. 21, 2015, 12 pages.
David E Allred, United States Patent and Trademark Office, Non Final Office Communication re U.S. Appl. No. 14/063,647, dated Aug. 18, 2015, 19 pages.
Matthew W Ing, United States Patent and Trademark Office, Non Final Office Communication re U.S. Appl. No. 14/609,092, dated Oct. 19, 2015, 11 pages.
Alexander Scott Harrison, United States Patent and Trademark Office, Final Office Communication re U.S. Appl. No. 14/243,027, dated Jan. 20, 2016, 17 pages.
Alexander Scott Harrison, United States Patent and Trademark Office, Non Final Office Communication re U.S. Appl. No. 14/243,027, dated Aug. 13, 2015, 15 pages.
Ryan D Kwiecinski, United States Patent and Trademark Office, Non Final Office Communication re U.S. Appl. No. 14/230,961, dated Dec. 24, 2015, 12 pages.
Dhilip F Gabler, United States Patent and Trademark Office, Final Office Communication re U.S. Appl. No. 14/257,655, dated Dec. 18, 2015, 10 pages.
Philip F Gabler, United States Patent and Trademark Office, Non Final Office Communication re U.S. Appl. No. 14/257,655, dated Aug. 20, 2015, 10 pages.
Syed A Islam, United States Patent and Trademark Office, Final Office Communication re U.S. Appl. No. 14/275,368, dated Nov. 13, 2015, 13 pages.
Syed A Islam, United States Patent and Trademark Office, Non Final Office Communication re U.S. Appl. No. 14/275,368, dated May 6, 2015, 10 pages.
Laurie K Cranmer, United States Patent and Trademark Office, Non Final Office Communication re U.S. Appl. No. 14/505,675, dated Aug. 31, 2015, 7 pages.
Rodney Barnett White, United States Patent and Trademark Office, Non Final Office Communication re U.S. Appl. No. 14/600,166, dated Nov. 2, 2015, 7 pages.
Rodney Barnett White, United States Patent and Trademark Office, Final Office Communication re U.S. Appl. No. 14/534,296, dated Dec. 11, 2105, 14 pages.
Rodney Barnett White, United States Patent and Trademark Office, Non Final Office Communication re U.S. Appl. No. 14/534,296, dated Aug. 26, 2015, 13 pages.
Sanjeev Malhotra, United States Patent and Trademark Office, Non Final Office Communication re U.S. Appl. No. 14/534,285, dated Sep. 23, 2015, 14 pages.
Nicole T Verley, United States Patent and Trademark Office, Non Final Office Communication re U.S. Appl. No. 14/635,025, dated Dec. 4, 2015, 8 pages.

\* cited by examiner

PASSIVE CONFORMAL SEAT WITH HYBRID AIR/LIQUID CELLS

FIELD OF THE DISCLOSURE

The present disclosure generally relates to a vehicle seating assembly, and more particularly to a passive conformal seat with hybrid air/liquid cells for a vehicle seating assembly.

BACKGROUND OF THE DISCLOSURE

Seating assemblies for vehicles typically include a seatback to support the back of an occupant in an upright seated position and various reclined positions. Seatbacks of these vehicle seating assemblies are commonly designed to support an occupant upon acceleration, change in direction, and collision of the vehicle, such that the seatbacks are substantially rigid in construction and can utilize beneficial safety features.

SUMMARY OF THE DISCLOSURE

According to one aspect of the present disclosure, a vehicle seating assembly includes a rigid shell. A conformal seating assembly is coupled with the rigid shell. The conformal seating assembly includes a seat base, a seatback base, seat side bolsters, and seatback side bolsters. The conformal seating assembly includes an air-filled sender panel disposed in the seat base. An air-filled receiver cell is disposed in one of the seat side bolster and the seatback side bolster. A liquid-filled sender panel is disposed between the air-filled sender panel and the rigid shell. A liquid-filled receiver cell adjacent the air-filled receiver cell and disposed in one of the seat side bolster and the seatback side bolster. A first system distribution rail is disposed on a first side of the seat base. A second system distribution rail is disposed on a second side of the seat base. A plurality of capillaries provide fluid communication between the air-filled sender panel and the air-filled receiver cell. A plurality of capillaries provide fluid communication between the liquid-filled sender panel and the liquid-filled receiver cell. A topper pad extends over the conformal seating assembly.

According to another aspect of the present disclosure, a vehicle seating assembly includes a rigid shell. A conformal seating assembly is coupled with the rigid shell. An air-filled sender panel is disposed in a seat base. An air-filled receiver cell is disposed in one of a seat side bolster and a seatback side bolster. A liquid-filled sender panel is disposed between the air-filled sender panel and the rigid shell. A liquid-filled receiver cell is adjacent the air-filled receiver cell and is disposed in one of the seat side bolster and the seatback side bolster. A topper pad extends over the conformal seating assembly. A first distribution rail is disposed on a first side of the seat base and a second distribution rail is disposed on a second side of the seat base.

According to yet another aspect of the present disclosure, a vehicle seating assembly includes a rigid shell. A conformal seating assembly is coupled with the rigid shell. A passive air-filled sender panel is disposed in a seat base having a distribution rail assembly and includes an air-filled receiver cell. A passive liquid-filled sender panel is disposed between the air-filled sender panel and the rigid shell. A liquid-filled receiver cell is adjacent the air-filled receiver cell. A topper pad extends over the conformal seating assembly.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
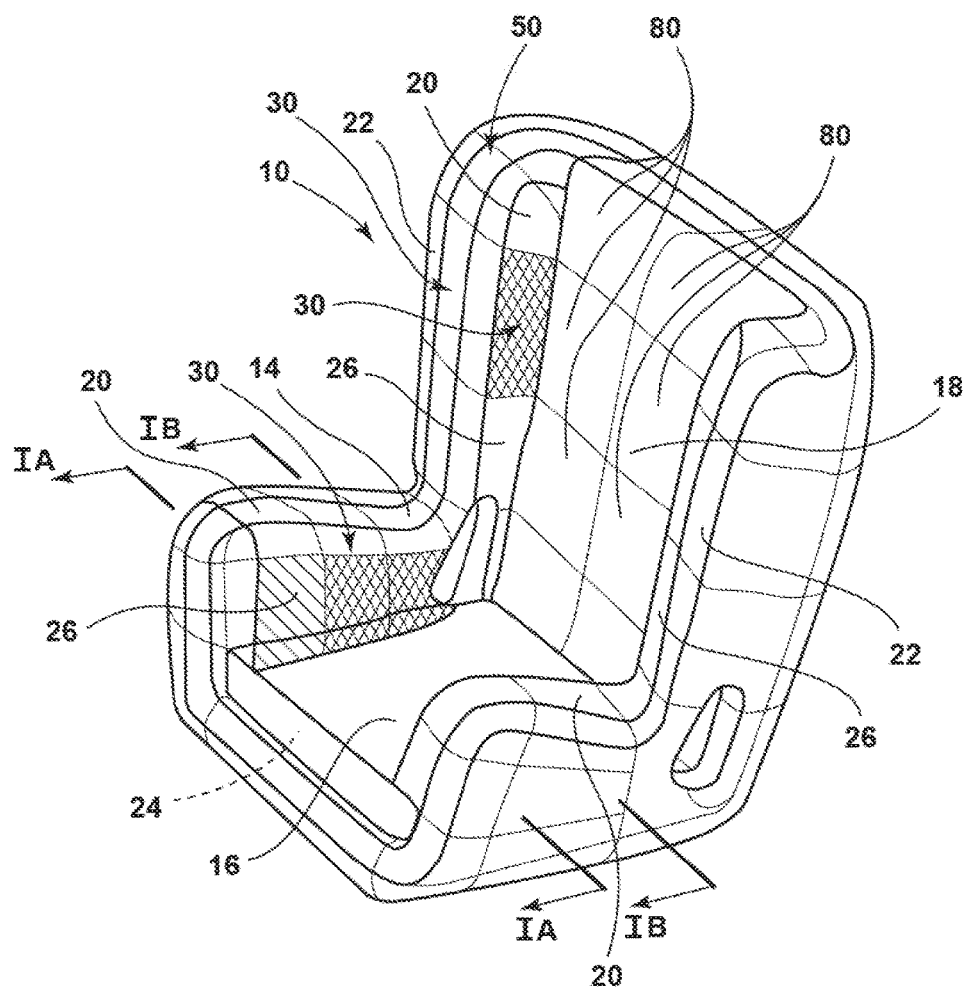
FIG. 1 is a front perspective view of one embodiment of a vehicle seating assembly of the present disclosure disposed in a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-4, reference numeral 10 generally designates a vehicle seating assembly that includes a frame generally defined by a rigid shell 12. A conformal seating assembly 14 is coupled with the rigid shell 12. The conformal seating assembly 14 includes a seat base 16, a seatback 18, seat side bolsters 20, seatback side bolsters 22, and independent support cells 80. The conformal seating assembly 14 includes an air-filled sender panel 24 disposed in the seat base 16. Air-filled receiver cells 26 are disposed in the seat side bolsters 20 and the seatback side bolsters 22. A liquid-filled sender panel 28 is disposed between the air-filled sender panel 24 and the rigid shell 12. A liquid-filled receiver cell 30 is adjacent the air-filled receiver cell 26 and disposed in the seat side bolsters 20 and the seatback side bolster 22. A first air distribution system 32 which includes a first air distribution rail 32A and a second air distribution rail 32B is disposed on a first (or left-hand) side of the seat base 16. The distribution rail 32A couples the air-filled sender panels 24 on a first side of the vehicle seating assembly 10 with the air-filled receiver cells 26 on that side, while the distribution rail 32B couples the air-filled sender panels 28 on a second side of the vehicle seating assembly 10 with the air-filled receiver cells 26 on the second side of the vehicle seating assembly 10. A second distribution system 36 which includes a first distribution rail 36A and a second distribution rail 36B is disposed on a second (or right-hand) side of the seat base 16. The distribution rail 36A couples the liquid-filled sender panels 28 on a first side of the vehicle seating assembly 10 with the liquid-filled receiver cells 30 on that side, while the distribution rail 36B couples the liquid-filled sender panels 28 on a second side of the vehicle seating assembly 10 with the liquid-filled receiver cells 30 on the second side of the vehicle seating assembly 10. A plurality of capillaries 40 provide fluid communication between the air-filled sender panels 24 and the air-filled receiver cells 26. The air-filled sender panels 24 include left-side sender panels 24L and right-side sender panels 24R. A plurality of capillaries 42 provide fluid communication between the liquid-filled sender panel 28 and the liquid-filled receiver cell 30. A topper pad 44 extends over the conformal seating assembly 14. In addition, cushioning may be provided in space 45, which is defined between the topper pad 44 and the sender cells 24.

With reference again to FIGS. 1-3B, the illustrated vehicle seating assembly 10 is configured for use in a wide variety of applications. The vehicle seating assembly 10 defines a passive conformal seating assembly that can be used in various vehicle groups from racing to luxury to utility, as each vehicle group is configured to provide or accommodate an occupant with personalized form-fitting comfort.

It is generally contemplated that the passive conformal seating assembly is configured for use with a separate stand alone seat base, plus a seatback, or be a single integral seating unit containing both the seat base and the seatback. In either instance, the passive conformal seating assembly includes interconnected pressure cells that can conform to the seated contact area of an occupant. The cells employ either an air or liquid phase fluid, or a combination thereof. It is also contemplated that ferromagnetic fluids can be used which include electromagnetic chokes rather than geometric constrictions to control fluid flow.

The passive conformal seating assembly provides occupant benefits that initiate once an occupant takes a seating position. Once the occupant is seated, the vehicle seating assembly 10 automatically and passively adjusts to the body mass and shape of the occupant. In one embodiment, after three seconds, the adjusted position of the seat becomes locked. Once in the locked position, biometrics of the occupant are electronically keyed into a controller. When the occupant returns to the vehicle, the vehicle seating assembly 10 will recognize the occupant and automatically lock when the prior setting of the occupant is achieved. This recognition is shared with the vehicle's security or infotainment system to welcome the occupant or activate the alarm system.

Figure 1A:
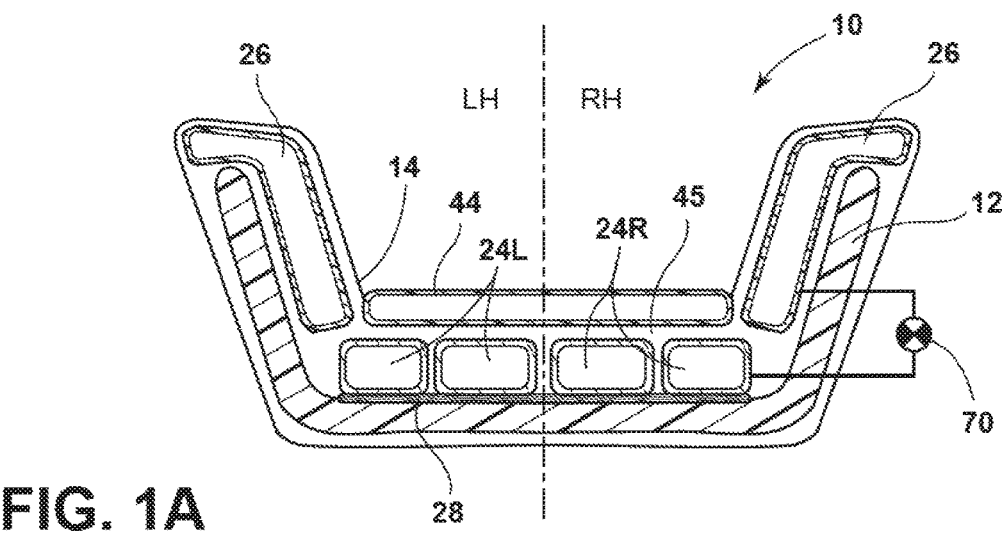
FIG. 1A is an enlarged front cross-sectional view of a conformal seating assembly of the vehicle seating assembly of FIG. 1.
Figure 1B:
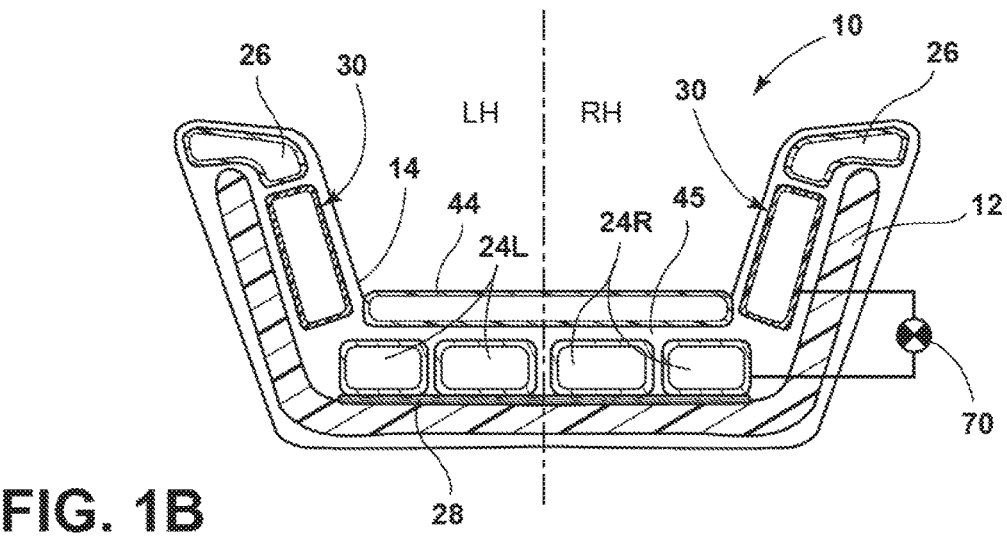
FIG. 1B is an enlarged cross-sectional view of another conformal seating assembly of the vehicle seating assembly of FIG. 1.

With reference now to FIGS. 1A and 1B, a vehicle seating assembly 10 in the form of a sport seat construction is generally illustrated. The sport seat construction includes a deep shell with firm seat side bolsters 20 and firm seatback side bolsters 22. The passive conformal seating assembly is generally defined to eliminate pressure points, thereby allowing comfortable support during prolonged use. The seat side bolsters 20 and the seatback side bolsters 22 of the sport seating assembly can become extra-firm to support high lateral forces without discomfort. In addition, the seat side bolsters 20 and the seatback side bolsters 22 eliminate or minimize transfer of high loads to the occupant's pressure points during travel or a collision event. The contact surfaces of the vehicle seating assembly 10 may be a hybrid of liquid and air fluid cells, with the liquid cells supporting the high loads and the air cells supporting the lower loads. A liquid-filled support cell has the stiffness of enclosing elastomeric walls. Accordingly, the cells that include liquid are not hard, but lack the compressibility of an air-filled cell. The air fluid cells have a higher compressibility and are configured to allow more movement of an occupant within the confines of the vehicle seating assembly 10.

Figure 2:
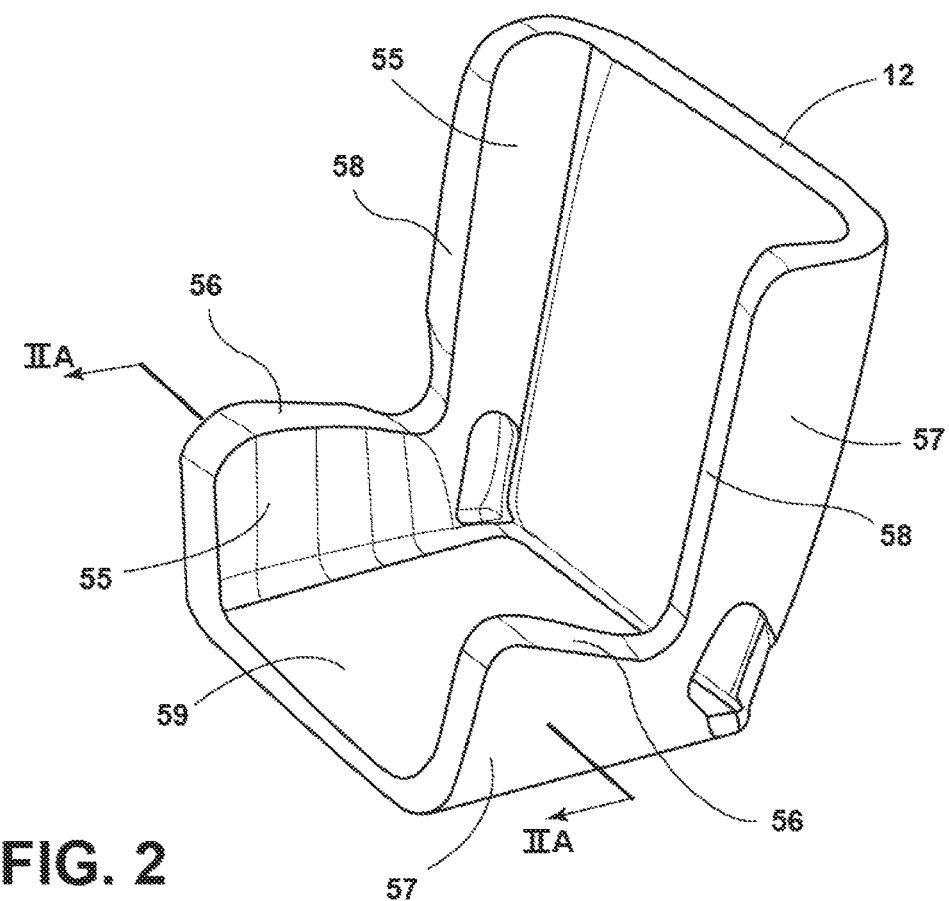
FIG. 2 is a front perspective view of another embodiment of a shell of a vehicle seating assembly of the present disclosure.

The sport seat construction of the vehicle seating assembly 10 has a rigid "bucket" construction typical of a traditional sport seating arrangement having shell 12, as shown in FIG. 2. However, non-sport seats can use this technology coupled with a reclinable seatback. In the illustrated embodiment, the vehicle seating assembly 10 is draped with a cloak-like passive conformal seat trim 50. The trim 50 includes a finished surface backed by a formed cell structure. The trim 50 is self-contained, and attaches to the vehicle seating assembly 10 with hook and loop fasteners, fir trees, etc. The trim 50 fully wraps the vehicle seating assembly 10 and covers the cell structure, which forms a system of sender panels 24, 28 and receiver cells 26, 30 connected by the molded-in network of capillaries or rails 32A, 32B, 36A, 36B, which are controlled by piloted two-way valves 54. As shown in FIG. 2, the single composite frame or shell 12 has a generally rigid construction that may be utilized with the passive conformal seating assembly as set forth herein. The composite frame or shell 12 includes first and second sidewalls 55, 57, as well as a base wall 59, and may be constructed of any of a number of materials, including plastics and/or metals. In addition, the shell 12 includes base bolsters 56 and seatback bolsters 58 protruding from the sidewalls 55, 57 that are generally configured to support the sides of the occupant.

The sender panels 24, 28 are mounted in the seat base 16 beneath the occupant and supply fluids to the receiver cells 26, 30 that make up the conformal seat trim 50 and provide comfort to the cushion area of the seat base 16. Each sender panel 24, 28 has two states: 1) a seat unoccupied state, and 2) a seat occupied state. In the unoccupied state, the sender panels 24, 28 are thicker than when in the occupied state, and appear to give the occupant a high H-point. When the occupant is seated, the weight of the occupant causes the sender panels 24, 28 to be compressed, which drives air through the piloted two-way shut-off valves 54 to the receiver cells 26, 30 distributed throughout the trim 50. As previously noted, the trim 50 is wrapped over the shell 12 and secured to the sides, bottom, and rear of the vehicle seating assembly 10. The piloted two-way shut-off valves 54 are activated simultaneously by a signal, opening when the seat becomes unoccupied, and closing after 't' seconds when occupied to lock the condition of the seat by the comfort setting unit. The sport seat construction of the vehicle seating assembly 10 may include a sender panel 28 that is liquid-filled below the air-filled sender panel 24 to provide flow of liquid to receiver cell 30 to firm up either or both of the seat side bolsters 20 and the seatback side bolsters 22. This liquid-filled sender panel 28 may also be added beneath the air-filled sender panel 24 to raise or elevate shorter occupants.

Figure 2A:
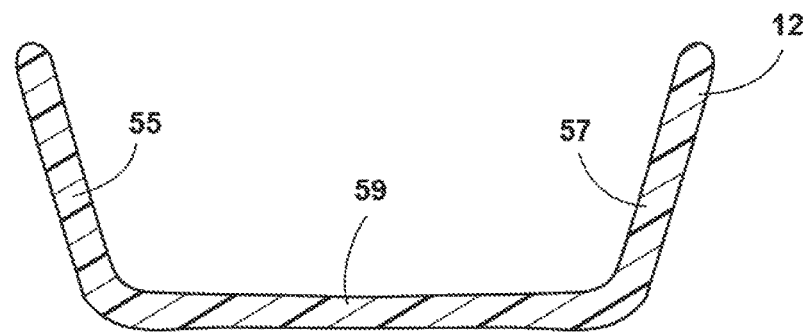
FIG. 2A is an enlarged cross-sectional view of a shell of the vehicle seating assembly of FIG. 2 having sidewalls and a base wall.

With reference again to FIGS. 1-2A, a comfort control valve 70 may be integrally or remotely located relative to the vehicle seating assembly 10. The comfort control valve 70 is configured to shut off the air and liquid flow from the sender panels 24, 28 to the receiver cells 26, 30 to limit the hardness or firmness of the receiver cells 26, 30. This valve assembly is both manual and automatic to control seat comfort. As shown in FIG. 1A, the sender panels 24, 28 are configured to move air from below the seated occupant to the receiver cells 26, 30 located in the seat side bolsters 20 and the seatback side bolsters 22. Stated differently, when an occupant applies a force to the passive conformal seating assembly by applying the weight of the occupant to the sender panels 24, 28 such that the sender panels 24, 28 squeeze between the occupant and the composite structure, the air fluid moves to the receiver cells 26, 30.

A typical function cycle for a passive conformal seating assembly as used in a sport seating construction includes the following steps. Initially, the unoccupied hybrid seat will contain two pressures, a first pressure for the passive air system, and a second pressure for the passive liquid system. The sender panels 24, 28 beneath the occupant will be thicker to support the occupant at the desired H-point after compression. As the occupant sits, the occupant compresses the sender panels 24, 28, forcing both air and liquid into the distribution rails 32A, 32B, 36A, 36B through the two-way piloted shut-off valves 54. The air and liquid move through the capillaries 40, 42 to specific receiver cells 26, 30 to which the rails or capillaries 32A, 32B, 36A, 36B are connected, thereby expanding the specific receiver cells 26, 30. The receiver cells 26, 30 will expand to press against the occupant, and will equalize the pressure between the sender panels 24, 28 and the receiver cells 26, 30, unless the comfort control valve 70 closes the two-way piloted shut-off valves 54 first. Use of the comfort valve 70 to limit the receiver pressure closes the two-way piloted shut-off valves 54 before the full sender pressure and fluid flow is applied to the receiver cells 26, 30. When the biometric identification is active, the system actually operates a comfort button in place of manual control. If the comfort button is activated in the first second of the seating process, for a softer seat, the system will override the biometric target and will reset it. Once the occupant is seated at the desired level of seat surface conformance, the seat pressures are locked by the system. It will generally be understood that high lateral "G" forces or high jounce loads will not alter the conformant settings. If increased conformance is desired, activation of the comfort button will allow additional air and liquid flow from the sender panels 24, 28 to the receiver cells 26, 30 to increase the firmness of the seat base 16 and the seatback 18. As the occupant leaves the seat base 16, the occupant will unload the sender panels 24, 28, thereby releasing the pressure in the pilot line to the two-way piloted shut-off valves 54. Consequently, the valves 54 open a backward flow from the resilient receiver cells 26, 30 to the sender panels 24, 28. The seat base 16 and the seatback 18 will automatically return to an original initial unoccupied condition due to the natural resiliency of the elastomeric cell material of the trim 50.

Figure 3:
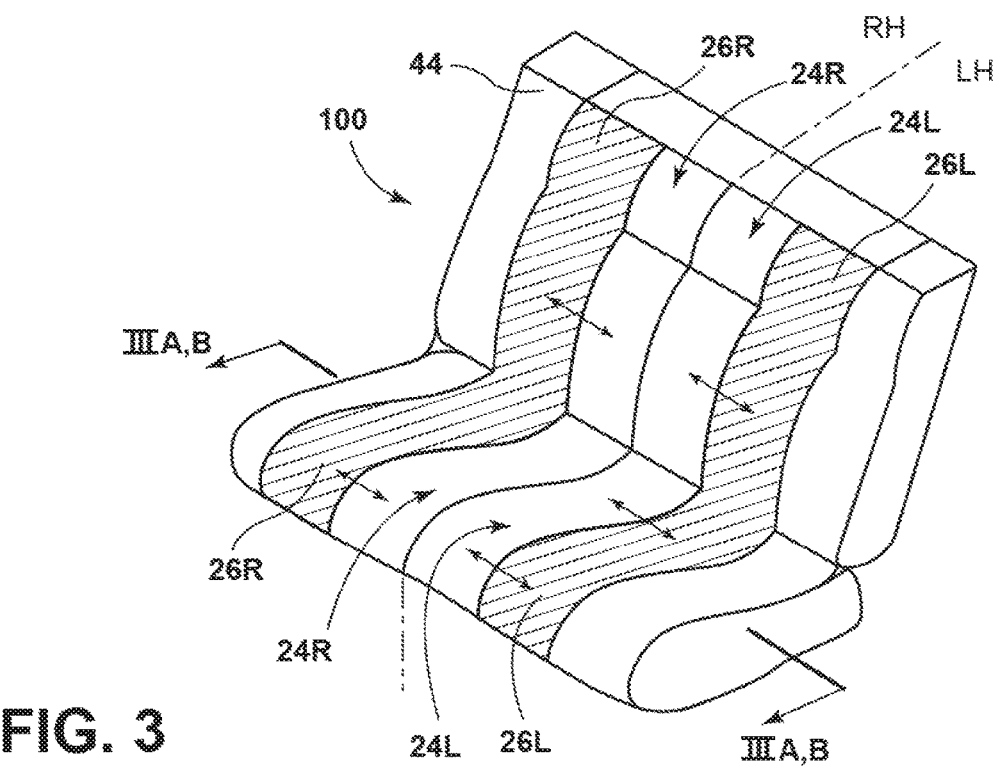
FIG. 3 is a front perspective view of another embodiment of the vehicle seating assembly of the present disclosure for a single seating position, front or rear seats.

With reference now to FIG. 3, a vehicle seating assembly 100 is illustrated for use as a luxury vehicle's rear seat surface is configured to provide a less laterally constraining support than the sport seat to minimize possible pressure points as the seating surface conforms to the supported area of an occupant's body. All seat categories enable the occupant to preselect a firmer, plush, or other setting. The setting is automatically reused when the system identifies the occupant by the occupant's "seated biometrics." The use of a non-rigid shell provides a comfortable conformal seat for non-sport applications. By use of a separate/remote liquid and air pressure source, the passive/active system can be composed from this disclosure. The entire system can be a single assembly with the coverstock such that all active seat system parts can be wrapped over the shell and secured into position.

Figure 3A:
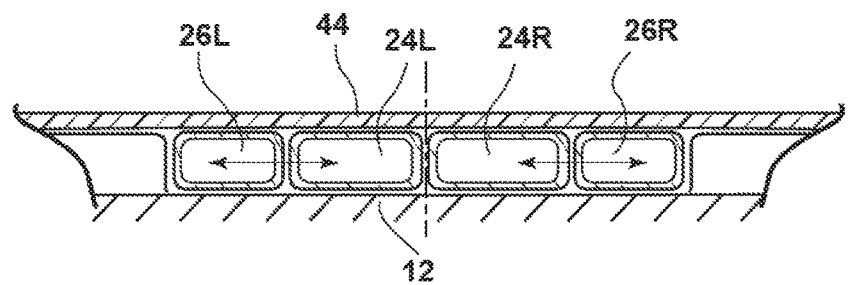
FIG. 3A is an enlarged cross-sectional view of the shell of the vehicle seating assembly of FIG. 3 in an unoccupied position.
Figure 3B:
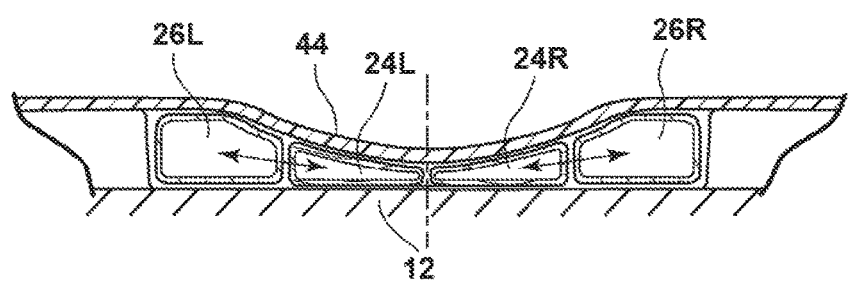
FIG. 3B is an enlarged elevational view of the shell of the vehicle seating assembly of FIG. 3 in an occupied position.

With reference to FIGS. 3A and 3B, application of force to the sender panels 24 is illustrated. In FIG. 3A, the vehicle seating assembly 100 is unoccupied such that the sender panels 24 are full of air and maintain a generally full appearance. Upon application of force to the sender panels 24, air is moved to the receiver cells 26 from the sender panels 24. As a result, the occupied seat menu generally maintains a seat that conforms to the buttocks and back of the occupant. It will also be noted that the receiver cells 26, 30 can cross the seat base 16 and the seatback 18 laterally from side to side in front and to the rear of the sender panels 24, 28 for added comfort. However, the left-hand and right-hand sides of the seat are generally separated in order to provide lateral stability (FIG. 4).

A luxury seat function cycle typically is used as set forth below. When unoccupied, the luxury seat contains one pressure for passive air. The sender panel 24 beneath the occupant is higher than necessary to support the occupant at the H-point. As the occupant sits on the sender panel 24, the occupant compresses the air forcing the air through the piloted two-way shut-off valves 54 into the first and second distribution rails 32A, 32B, 36A, 36B. The air is then forced through the capillaries 40 to the specific receiving cells 26, thereby expanding the receiving cells 26. The cells 26 will continue to expand until the cells 26 press against the occupant, and the pressure equalizes between the sender panels 24 and the receiver cells 26. As with the sport construction, use of the comfort button to limit the receiver pressure closes the two-way piloted shut-off valves 54 before the full pressure of the sender panels 24 is applied to the receiver cells 26. When the biometric identification of the occupant is determined, and the biometric identification system is active, the biometric identification acts in a similar manner to the comfort button. If the comfort button is activated in the first second of the seating process, the comfort button will override the biometric target and reset the biometric target. Once the occupant is seated and the desired level of seat surface conformance is achieved, the seat pressures are locked by the system. It will be understood that high lateral G forces or high jounce will not alter the conformance setting when the seat is locked. If an increased conformance is desired, activation of the comfort button will allow additional airflow from the sender panels 24 to the receiver cells 26. As the occupant leaves the seat base 16, the occupant will unload the sender panels 24. As a result, the pressure is released into the two-way piloted shut-off valves 54, allowing a backward flow from the receiver cells 26 to the sender panels 24. The seat base 16 and the seatback 18 will automatically return to an original unoccupied condition due to the natural resiliency of the elastomeric cell material of the trim 50.

It will be generally understood that the vehicle seating assembly may also include a utility seat construction. In this instance, the utility seat includes features discussed herein in reference to both the sport and luxury concepts. However, an extra air cell system may be provided beneath the seat base for increased height adjustment and improved jounce protection. Lumbar support can be added by interconnection of the lower cell row of 80 and the separate control of its expansion.

Figure 4:
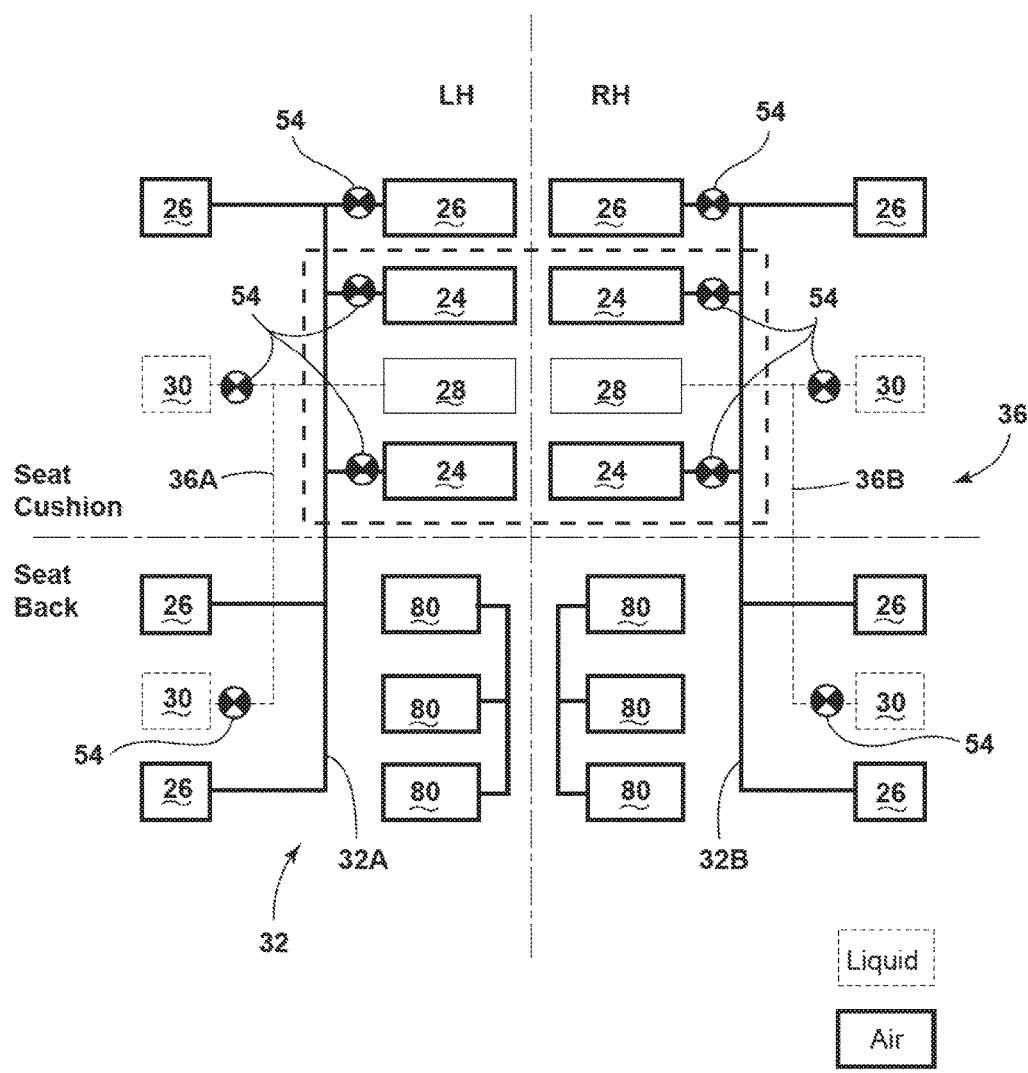
FIG. 4 is a schematic view of the functional components of the vehicle seating assembly of the present disclosure.

With reference now to FIG. 4, a schematic view of the functional components is illustrated. The liquid-filled receiver cells 30 are disposed at high force areas of the seat side bolsters 20 and the seatback bolsters 22. Air-filled receiver cells 26 are disposed adjacent to the liquid-filled receiver cells 30 and are disposed at low force areas of the bolsters 20, 22. The plurality of capillaries 40, 42 couple the liquid-filled receiver cells 30 with the liquid-filled sender panels 28 and the air-filled receiver cells 26 with the air-filled sender panels 24. Piloted two-way shut-off valves, in this case two-way piloted shut-off valves 54, are disposed at exits of the sender panels 24, 28 (both air and liquid). Also, the first and second distribution rails 32A, 32B, 36A, 36B are disposed on both the left-hand and right-hand side of the vehicle seating assembly 10. The seat base 16 is generally symmetric about its center with the left-hand and right-hand sides being fluidically separated and mere opposites of one another. It will generally be understood that any number of sender panels 24, 28 may be disposed in the vehicle seating assembly 10. Likewise, any number of receiver cells 26, 30 may be present in the vehicle seating assembly 10.

Traditional foam-based seating assemblies typically require multiple separate components and have only partial conformal characteristics. Often, many of the seating assemblies include a seating frame wrapped by a foam jacket, a foam backed seat trim cover, left-hand and right-hand seat bolster bladder packs, left-hand and right-hand seatback packs, lumbar support bladder packs, seat cushion bladders, and anti-support bladders. Each of the bladder units have plastic supply tubes coupled with a bulky and generally expensive valve control unit. The system is expensive, difficult to package within the seat, difficult to service and/or replace, and subject to potential buzz, squeak, and rattle concerns, as well as noise, vibration, and harshness concerns.

The passive conformal seating assembly as set forth above in relation to sport seats, luxury seats, and utility seats offer an improved singular unit that uses the body weight of an occupant, as well as the general shape of the occupant, to set the relative conformal characteristics of the seating assembly.

It will be understood that the various configurations, as disclosed herein, have common features and components. It will also be understood that for those features that are not common among the various configurations, different reference numerals will signify those aspects of the various configurations.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:
1. A vehicle seating assembly comprising:
   a rigid shell;
   a conformal seating assembly coupled with the rigid shell, the conformal seating assembly having a seat base, a seatback base, seat side bolsters, and seatback side bolsters, the conformal seating assembly comprising:
      an air-filled sender panel disposed in the seat base;
      an air-filled receiver cell disposed in one of the seat side bolster and the seatback side bolster;

a liquid-filled sender panel disposed between the air-filled sender panel and the rigid shell; and a liquid-filled receiver cell adjacent the air-filled receiver cell and disposed in one of the seat side bolster and the seatback side bolster;

a plurality of capillaries that provide fluid communication between the air-filled sender panel and the air-filled receiver cell;

a plurality of capillaries that provide fluid communication between the liquid-filled sender panel and the liquid-filled receiver cell; and a topper pad extending over the conformal seating assembly.

2. The vehicle seating assembly of claim 1, wherein the rigid shell includes a base wall and first and second sidewalls.

3. The vehicle seating assembly of claim 1, further comprising:
a cushion layer disposed between the liquid-filled sender panel and the air-filled sender panel.

4. The vehicle seating assembly of claim 1, wherein the conformal seating assembly includes fasteners for securing the conformal seating assembly to a seating unit in a vehicle.

5. The vehicle seating assembly of claim 1, further comprising:
piloted shut off valves disposed between the liquid-filled sender panel and the liquid-filled receiver cells.

6. A vehicle seating assembly comprising:
a rigid shell;
a conformal seating assembly coupled with the rigid shell and comprising:
an air-filled sender panel disposed in a seat base;
an air-filled receiver cell disposed in one of a seat side bolster and a seatback side bolster;
a liquid-filled sender panel disposed between the air-filled sender panel and the rigid shell; and
a liquid-filled receiver cell adjacent the air-filled receiver cell and disposed in one of the seat side bolster and the seatback side bolster;
a topper pad extending over the conformal seating assembly; and
a first distribution rail disposed on a first side of the seat base and a second distribution rail disposed on a second side of the seat base.

7. The vehicle seating assembly of claim 6, wherein the rigid shell includes a base wall and first and second sidewalls.

8. The vehicle seating assembly of claim 6, further comprising:
a cushion layer disposed between the liquid-filled sender panel and the air-filled sender panel.

9. The vehicle seating assembly of claim 6, wherein the conformal seating assembly includes fasteners for securing the conformal seating assembly to a seating unit in a vehicle.

10. The vehicle seating assembly of claim 6, further comprising:
piloted shut off valves disposed between the liquid-filled sender panel and the liquid-filled receiver cells.

11. The vehicle seating assembly of claim 6, wherein the liquid-filled receiver cell is disposed at a high force area in the bolster.

12. The vehicle seating assembly of claim 6, wherein the air-filled receiver cell is disposed at a low force area in the bolster.

13. A vehicle seating assembly comprising:
a rigid shell;
a conformal seating assembly coupled with the rigid shell and comprising:
a passive air-filled sender panel disposed in a seat base having a distribution rail assembly;
an air-filled receiver cell;
a passive liquid-filled sender panel disposed between the air-filled sender panel and the rigid shell; and
a liquid-filled receiver cell adjacent the air-filled receiver cell; and
a topper pad extending over the conformal seating assembly.

14. The vehicle seating assembly of claim 13, wherein the rigid shell includes a base wall and first and second sidewalls.

15. The vehicle seating assembly of claim 13, further comprising:
a cushion layer disposed between the liquid-filled sender panel and the air-filled sender panel.

16. The vehicle seating assembly of claim 13, wherein the conformal seating assembly includes fasteners for securing the conformal seating assembly to a seating unit in a vehicle.

17. The vehicle seating assembly of claim 13, further comprising:
piloted shut off valves disposed between the liquid-filled sender panel and the liquid-filled receiver cells.

18. The vehicle seating assembly of claim 13, wherein the distribution rail assembly includes a first distribution rail disposed on a first side of the seat base and a second distribution rail disposed on a second side of the seat base.

19. The vehicle seating assembly of claim 13, wherein the liquid-filled receiver cell is disposed at a high force area in a bolster.

20. The vehicle seating assembly of claim 19, wherein the air-filled receiver cell is disposed at a low force area in the bolster.

* * * * *